A. E. GREENE.
PROCESS OF EXTRACTING AND REFINING METALS AND ORES.
APPLICATION FILED DEC. 6, 1909.
1,034,788.
Patented Aug. 6, 1912.
2 SHEETS—SHEET 1.
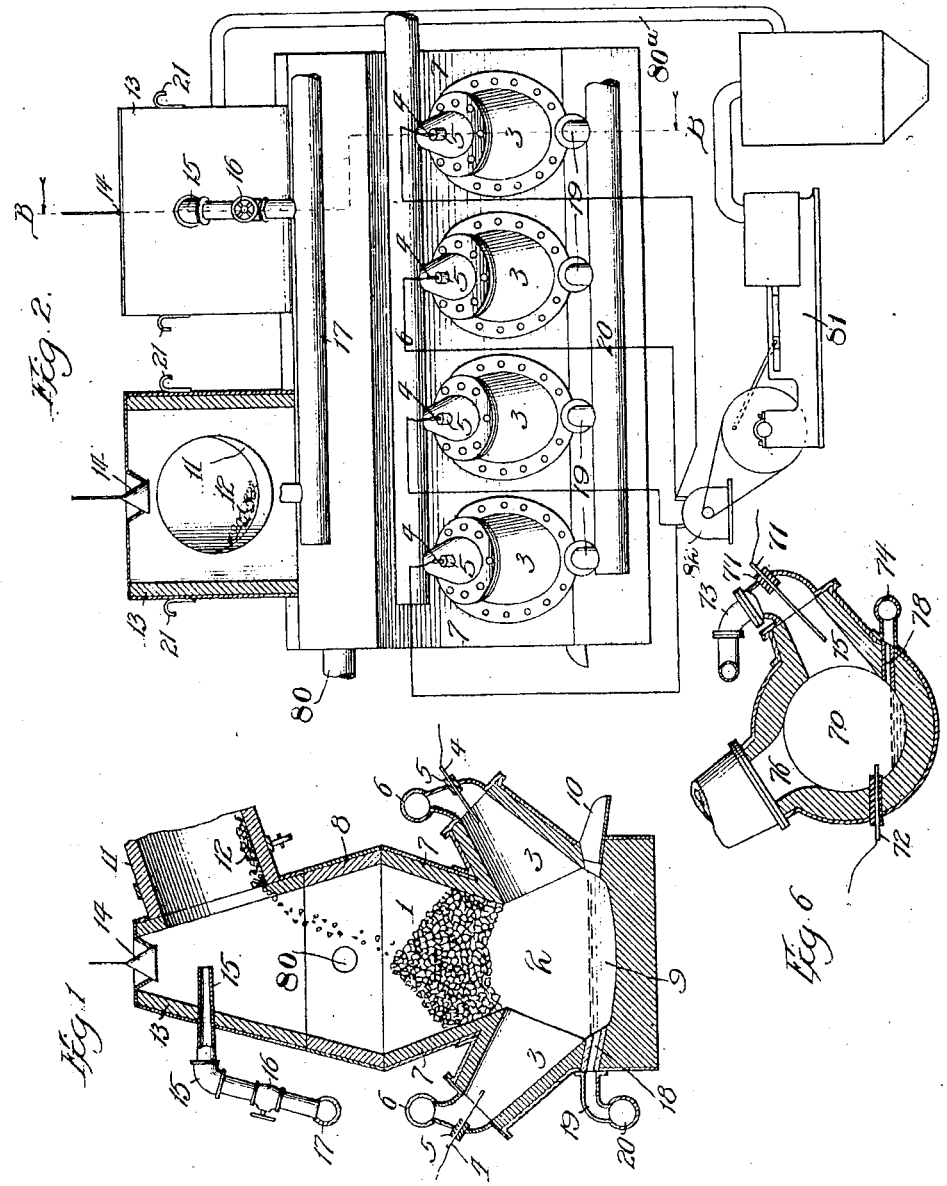

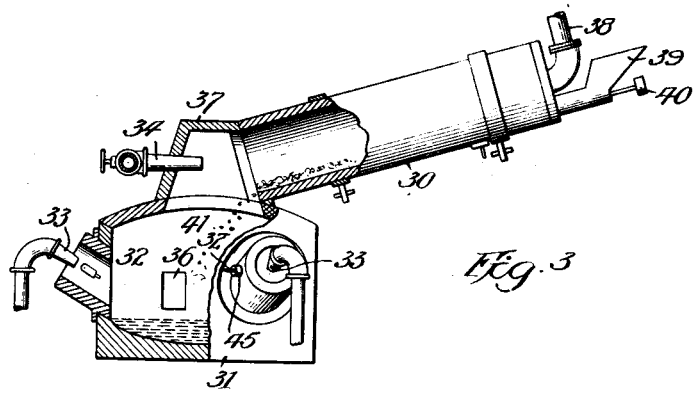
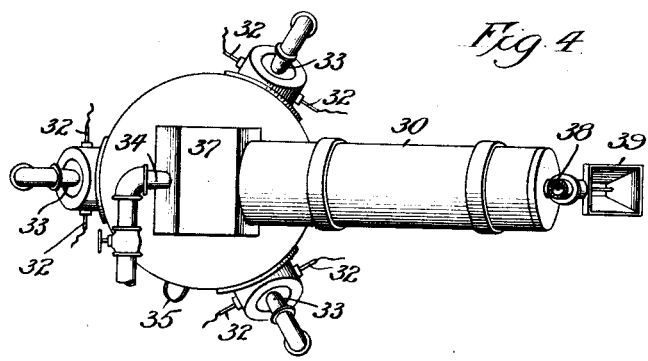
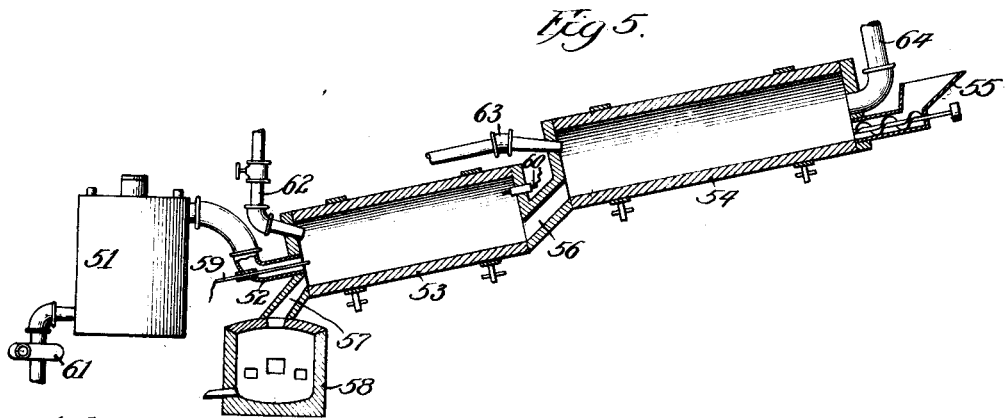

UNITED STATES PATENT OFFICE.

ALBERT E. GREENE, OF CHICAGO, ILLINOIS, ASSIGNOR TO AMERICAN ELECTRIC SMELTING AND ENGINEERING COMPANY, OF ST. LOUIS, MISSOURI, A CORPORATION OF MISSOURI.

PROCESS OF EXTRACTING AND REFINING METALS AND ORES.

1,034,788.        Specification of Letters Patent.        Patented Aug. 6, 1912.

Application filed December 6, 1909. Serial No. 531,529.

*To all whom it may concern:*

Be it known that I, ALBERT E. GREENE, citizen of the United States, residing at Chicago, in the county of Cook and State of Illinois, have invented a certain new and useful Improvement in Processes of Extracting and Refining Metals and Ores, of which the following is a full, clear, concise, and exact description.

My invention relates to the extracting and refining of metals and ores. Its primary object is to provide a means of obtaining pure metals direct from ores.

My invention consists in treating the ore with gaseous reagents of desired composition and maintaining the temperature of the ore independently of the composition of the gas.

It also consists in certain modifications in treating the ore by means of a gas of controlled composition and supplying part of the heat by means other than combustion in the furnace chambers.

In one of its applications my invention relates to the reduction of iron ore direct to steel or a pure iron.

Another feature of my invention relates to the elimination of sulfur and phosphorus and similar impurities, such as arsenic, antimony, bismuth, tellurium, etc., from ores, mattes and in particular to the reduction of sulfid ores.

Another feature of the invention relates to the reduction of one or more metals and simultaneous elimination by oxidation of an impurity.

Still another feature relates to the separation of the impurity in combination with a fluxing material.

These and other features relating to the mode of operating the process and especially the method of reduction involving the used high potential arcs will be described below.

The present process of reducing iron ore embodies treatment in the presence of an excess of carbon which serves to supply heat by its oxidation. The metal produced invariably contains carbon which must be eliminated to make steel.

My invention provides a process of reducing the ore without excess of carbon. As a reducing agent a reducing gas may be used and the absence of solid carbon from the charge is preferred. As the source of heat electricity is used. To increase the efficiency of reduction the reducing gas is blown into contact with the ore in combination with the flame of a high potential arc and under the influence of the heat of the arc the elements of the gas are dissociated and their reducing action greatly facilitated. Thus, for example, a gas containing CO may be blown through the arc into contact with iron ore and the dissociated C acts directly on the ore with resultant reduction of iron oxid and formation of $CO_2$ and CO. The advantage of such treatment lies first in the production of steel or alloy metals direct from ore; and second in a great economy; and third, in combined refining and reduction. Furthermore, the use of the arc in close proximity to the ore and the combined influence of the high heat and the reducing gas provide a means of reducing very refractory ores such as aluminum and titanium, especially the latter. In the blast furnace the combustion of carbon hinders the removal of sulfur and practically prevents the elimination of phosphorus.

My process provides a means of eliminating the sulfur and phosphorus by making them combine with fluxing agents or eliminating them in the gas. In a co-pending application Serial No. 470,366, filed January 2nd, 1909, I disclosed a process of eliminating sulfur and phosphorus from metals while keeping the metal reduced. The present invention provides means for separating these elements in the reduction of the ore. The action depends in certain cases on the effect produced by blowing a reducing gas into a basic flux in contact with the metal to be refined. Analyses show that sulfur and phosphorus are contained in the slags produced in certain modifications of this process as sulfids and phosphids. The process of eliminating these two impurities while reducing the metal desired is accompanied by the use of a basic flux like lime or fluor-spar, and when this comes into the zone of the high temperature the impurities combine with the flux under the influence of the reducing gas and the metal is left in a molten refined state.

The present used methods of reducing sulfid ores of copper, lead, etc., involve, in general, a preliminary roasting to remove part of the sulfur, and then the reduction of the roasted material, and finally the refining of the reduced material. Various combinations of these separate features have been resorted to and also it has been suggested to use various endothermic agents to modify the temperature resultant from the oxidation of the sulfur and metal. Also numerous fluxing agents like lime, barium oxid, fluor spar, etc., have been used for the elimination of sulfur under influence of heat. None of these accomplished the elimination by the methods of my invention nor as easily or efficiently as by my process.

The process of my invention accomplishes the reduction of the metal and separation of the sulfur or like impurity therefrom simultaneously by the use of a gas with reducing properties forced into the material under definite temperature control. The elimination of sulfur or other like impurity may take place either in combination as a gas or in combination as a slag:—The former method may be by the process of my invention relative to the selective oxidation of one element while another is reduced or selective reduction of one while another is retained oxidized. Thus in the reduction of copper sulfid ores the ore may be treated, preferably under the influence of electric heat, by a gas having reducing and oxidizing properties and regulating the relative amounts of these and the temperature so that the sulfur will be oxidized to $SO_2$ and the copper or other metal left in a reduced state. The latter method, namely, the separation of the sulfur or like elements, in combination with a flux, may be carried out under the combined action of heat and a gas having reducing properties, whereby the copper or lead or either metal is left reduced and the sulfur or other impurity combines with the fluxing material under the influence of the reducing gas.

In the reduction or extraction of certain metals there are often elements present such as iron which can not be removed as a gas and which will not slag with lime or similar fluxes. These elements are usually reduced in methods now used with the copper or other metal and subsequently oxidized together with the sulfur as in the converter process. The result is a waste of heat and reducing agent to reduce and melt the iron and an extra cost of subsequently eliminating it. In the treatment of such ores by my process it is possible to reduce the copper, for example, and oxidize the sulfur and iron, slagging the iron by means of any suitable flux such as silica. The cost of reducing the iron and subsequently oxidizing it again is thereby saved.

In the conversion of mattes, especially those containing much iron, considerable difficulty is met with in controlling the temperature of the large volume of slag resulting in the process. Also where air is used for the blast the metal is left in a slightly oxidized condition which is usually remedied by "poling." In applying my process to the conversion of mattes both these objectionable features are avoided. By the use of high potential arcs terminating on the top of the bath the regulation of the temperature of the slag is simple and the use of a gas for oxidizing the impurities without oxidizing the metal leaves the metal in a pure state. The metal may be further purified by the use of a lime or similar basic flux heated by the arc flame and blown with a reducing gas to eliminate sulfur, tellurium, selenium, etc., and leaves the metal in a pure state.

The process of this invention is especially applicable to the treatment of lead sulfid ores with the object of obtaining the lead in a reduced molten state and separating the sulfur and other impurities therefrom in one single treatment. This may be accomplished by the use of gas having reducing properties for lead and either having oxidizing properties for sulfur and eliminating it as a gas or having such action, presumably reducing, on a lime or other basic flux for sulfur that the sulfur is taken up and separated from the lead as CaS. In certain cases the CaS may be oxidized to sulfate especially since the temperature is maintained preferably only a little above the melting point of lead. Where the impurities contained in the lead are capable of forming volatile or gaseous compounds the process of selective oxidation, whereby the sulfur is taken off as a gas, is preferred. The lead is left in a molten state and large amounts of slag are avoided. In this process it is preferred not to use electric heat but to supply the heat necessary to maintain the lead molten and the losses by using the highly heated gas directly from the producer. The composition of this gas may be regulated by the height of fuel bed and by placing the producer in close proximity to the converter. The heat generated in the producer is sufficient for the needs of the process.

The apparatus prepared for carrying out this process is in general similar to that disclosed in my co-pending application Serial No. 527,691, filed November 12th, 1909.

For the reduction of ores I have designed a furnace combining certain advantages of shaft furnaces and certain advantages of rotary kiln furnaces. This type of furnace is described in detail below. In general it consists of a rotary kiln in which the heating and partial reduction takes place and in combination with this a short shaft type furnace or a hearth furnace designed also for the process of this invention. In one of the modifications of this apparatus the greater part of the elimination of impurities or those capable of forming gaseous compounds takes place in the rotary chamber directly above the finishing furnace, and this chamber may be electrically heated by the use of long high potential arcs. The reducing gas leaving it may be burned in another rotary chamber into which the ore enters first and is there heated by the heat of combustion of the gas.

Referring to the drawings:—Figure 1 is a section through the line B B of Fig. 2 of a combined rotary and shaft furnace. Fig. 2 is a view of the furnace in Fig. 1 partly in section. Fig. 3 is an elevation of a combined rotary and hearth furnace partly in section. Fig. 4 is a plan view of the furnace shown in Fig. 3. Fig. 5 is a view of a rotary combination furnace together with a gas producer and finishing furnace, parts being in section. Fig. 6 is a section through a twyer of a converter adapted for practising the process.

Referring to Figs. 1 and 2. These are two views of a combination furnace including a rotary cylindrical chamber and a modified shaft furnace. This furnace is applicable to the treatment and refining of ores in general, and where desired to producing the finished metal in a refined state in a single operation. In the main smelting furnace 1 is the chamber in which the charge is contained and from which it enters into the smelting and refining chamber 2 just below it. The walls of 1 are convergent to act as a bosh. Entering through the walls of the smelting chamber are the electrode twyers 3 at the upper end of which enter the electrodes 4 through insulating material 5. The twyers are connected through pipe fittings to the blast mains 6. The lining of the bosh 7 may be of carbon or other refractory material. The main walls 8 of the furnace extend above the chamber 1. The rotary heating chamber is shown at 11 and connects with a removable end-piece 13 which serves to connect the rotary chamber with the main ore chamber 1. By this arrangement the ore 12, which passes through the rotary chamber 11, may drop into the ore chamber 1. 14 is a bell hopper for dumping material into the main ore chamber without passage through the rotary chamber. By means of the twyer 15 connected to the pipe 17 through the valve 16, air may be blown into the rotary chamber to burn the combustible gas coming from the ore chamber below. At 18 is shown a special twyer entering the lower portion of the furnace near or beneath the surface of the metal. The twyer is connected to any suitable source of supply of gas through the elbow 19 and pipe 20. The end-pieces 13 connecting the rotary chamber and main shaft are removable by hooks 21 for this purpose and thereby provide means for relining one of the rotary chambers without stopping the operation of the furnace.

Figs. 3 and 4 show a combination of a rotary chamber and hearth furnace applicable in general to the treatment of metals and ores. In these figures the rotary chamber 30 connects with the main hearth furnace 31 through the removable end-piece 37 joining the rotary kiln and the main hearth furnace through the opening 41. The electrodes are shown at 32 entering through insulating material 45. These electrodes are arranged so that the arc maintained between the two electrodes in each twyer opening may be blown down against the material on the hearth by means of gas entering through the twyer 33 and blowing out the arc. In the furnace shown there are three of these twyer openings for use with three phase current. Entering through the end block 37 is shown a twyer 34 which may be used for supplying air to burn the combustible gas through the chamber 30 and exhausting through the outlet 38. The charge may enter the chamber 30 through the hopper 39 by means of the screw shaft 40. The main hearth furnace has a door at 36 and a tapping spout at 35.

Referring to Fig. 5 there is shown a combination rotary furnace and finishing furnace together with a gas producer located adjacent to one of the refining chambers. The gas producer is of the pressure type and serves to supply gas of regulated composition and to carry the heat generated in the producer itself into the rotary chamber for the purpose of maintaining suitable temperatures in that chamber. The producer is shown at 51 connecting by means of the pipe 52 with the lower rotary chamber 53. This chamber connects through the opening 56 with the upper rotary chamber 54. The ore enters the chamber 54 through the hopper 55 and passes through the opening 56 into the lower chamber 53 and may then pass into suitable finishing furnace such as that shown at 58. The pressure producer is operated by the blower 61 which serves to force suitable air or gas through the producer and subsequently into the chamber 53. A special twyer 62 enters the end of the lower chamber 53 and serves for supplying air or gas from any suitable source. Likewise a similar twyer 63 may be placed in the lower end of the upper rotary chamber 54. The chamber 53 is fitted with electrodes 59 and 60 by which it is possible, when desired, to maintain an electric arc lengthwise of the chamber and thereby control the temperature in this chamber. These electrodes, however, need not be used where a temperature required is obtainable without their use. The finishing furnace 58 may be a gas fired furnace and if desired the hot gases from this furnace may be carried through the opening 57 into the chamber 53 and mixed there with any other gases desired.

Fig. 6 shows a sectional view of an electric converter applicable to the converting or refining of mattes and metals in general. This furnace has a main chamber 70, and electrode twyer opening 75 through which an electrode 71 enters through insulating material 77. This twyer connects by means of the pipe 73 to any suitable source of supply of gases. Another electrode is located at 72 which may be used when it is not desired to use the metal as one terminal for the ground or as the neutral. A special twyer entering near the surface of the charge is shown at 78 and connects with any suitable source of supply of gas to the pipe 74. The furnace is of the tilting type so that the location of this twyer may be varied with reference to the height of the charge in the chamber. The exhaust gases pass out from the opening 76.

I will now describe in detail several of the applications of my process and the methods of operation. As one typical example of the application of the process I will describe the treatment of a manganese iron ore to produce an alloy practically free from carbon and to eliminate the sulfur and phosphorus from the ore. The apparatus shown in Figs. 1 and 2 is suited for such a process. The ore charge containing lime for elimination of sulfur, phosphorus and silicon, and calculated to give, when reduced, the desired per cent. of manganese and iron, is fed into the rotary kiln by any suitable means such as the hopper and screw shown in Fig. 3. In this chamber it is heated by burning the reducing gas from the reducing chamber below, and the twyer 15 admits air for this purpose. From the rotary chamber it drops into the bosh of the main reducing furnace. Below the bosh the charge rests on the bottom of the furnace. Heating of the charge is accomplished by the long high potential arcs from the electrodes to the charge, and around these arcs is blown a reducing gas to act on the oxid and the fluxing agent lime. The result is that the metals are reduced and the lime is acted on by the reducing gas and reduction started. The reduced flux then combines with the sulfur and phosphorus and silicon, as more fully disclosed in my above-mentioned application Serial No. 470,366. The temperature is maintained high enough for this slag to be fluid. In the absence of oxid of manganese and iron oxids from the slag, it is easy to eliminate the sulfur and phosphorus and even the silicon. The product which might be a 12% manganese-iron is tapped out in a refined condition.

The process is applicable and may be carried out in the combination rotary and hearth furnace, but the passage of the hot gas up through the charge in the bosh is advantageous. It is also possible to use the type of arc discharge between two electrodes where the gas blows the flame down against the charge. The potential of these arcs is preferably between 400 and 4000 volts. This treatment is especially advantageous in its application to the reduction of titanium iron ore to produce ferro-titanium and titanium steel direct and also to the reduction of tungsten ores. Both of these ores are highly refractory and require very high temperatures to melt the metals reduced. Carbon may be charged with the ore, but this is undesirable because of its entrance into the metal. In the treatment of tungsten ores, especially those with calcium, one method is to control the temperature such that calcium has the greater affinity for oxygen than tungsten, and at this temperature treat the ore with a gas having reducing properties for tungsten and slag the calcium oxid with silica.

I will now describe the process of selective oxidation of sulfid ores, and take for an example the treatment of a copper iron sulfid to obtain the copper in a reduced molten condition. The ore together with silica to flux the iron oxid is charged into the rotary furnace chamber of Figs. 1 and 2, and is here heated by the burning gases and sulfur. The ore then drops into the lower chamber. Here the heating is done by the high voltage arcs, and as it is necessary to oxidize the sulfur, the gas blown with the arcs contains an oxidizing agent. This agent must not oxidize the copper, but must keep the iron oxidized, or oxidize it if it is in the form of sulfid. The temperature may be maintained at about 1200–1300° C. and the composition of the gas may be about 15% $CO_2$ and 7% $CO$. Under these conditions the copper will be reduced and collect in the lower part of the furnace from which it may be drawn off. The iron-silicate slag may also be tapped and the copper will be practically free from iron and sulfur.

In certain cases it may be desirable to maintain the temperature sufficiently high for keeping iron oxid fluid. When this is done and the silica omitted from the charge, the iron oxid may be tapped into an electric refining converter such as shown in Fig. 6 and blown under the influence of the electric heat and a reducing gas to reduce iron.

In the treatment of copper-sulfid ores and copper mattes I may employ the apparatus shown in Fig. 5. In this furnace the ore is preferably fed into the upper kiln through the hopper and is there heated by the burning of combustible gas from the lower kiln, but without appreciable oxidation of copper. In the next kiln, the temperature may be maintained by the use of long electric arcs extending through the kiln and the gas from the producer blown into this chamber. This gas contains regulated amounts of reducing and oxidizing components as CO and $CO_2$, in such amounts as will eliminate the sulfur as $SO_2$ and leave the copper reduced. As the copper may not be molten, it is preferably next dropped into a suitable melting furnace and separated from any earthy or silicious materials which might be with it. This is preferably done under the influence of electric heat and the character of the gas in the chamber controlled so that the copper will not oxidize.

Another method of treating copper sulfids, especially where they contain such elements as arsenic, antimony, tellurium, etc., is to charge a basic-alkaline earth flux, such as lime or fluor spar, with the sulfid or matte and act on this charge with a highly reducing gas under the influence of electric heat. This may be done in the type of furnace shown in Fig. 5, or it may be done in an electric converter such as shown in Fig. 6. The combined action of gas and flux takes out not only sulfur, but also practically all of the other elements like arsenic, etc., and leaves the copper very pure. Lead may be eliminated by the oxidizing gas and and combined with a flux. In fact this method may replace electrolytic refining of copper.

The selective oxidation process by which an element of an ore may be oxidized while the metal itself obtained reduced is specially applicable to the conversion of mattes. The apparatus shown in Fig. 6 is preferred for this purpose. Numerous of the objectionable features of the ordinary copper converter process are obviated. Furthermore, it is possible to treat mattes containing under 45% copper. The molten matte is placed in the electric vessel and blown with a gas containing CO or some other reducing agent and an oxidizing component. For example, a gas containing 6% CO and 16% $CO_2$ will oxidize the sulfur and iron and leave the copper reduced. The temperature is maintained sufficiently high by means of the high potential arcs blown down on the bath to keep the iron silicate or other slag molten, and this may be taken off at intervals. After the iron is oxidized, the sulfur which has a greater affinity for copper than for iron is then separated. After removing the oxid slag a lime or fluor spar slag or any alkaline earth slag capable of reacting with the last traces of such impurities as sulfur, selenium, tellurium, arsenic, antimony, etc., may be added and under the influence of the high heat and a reducing gas these impurities may be largely eliminated.

In treating nickel mattes which may contain iron, the nickel may be obtained as pure metal by the above process. Nickel melts at a considerably higher temperature than its matte and to keep the nickel molten the combination induction and arc type of furnace may be used. The gas would preferably be blown down on the surface of the matte, thereby freeing the nickel and oxidizing the sulfur and iron and the reduced nickel kept molten by the induction currents in it. In treating nickel ores and especially nickel-iron and nickel-copper sulfid ores, I prefer to carry out the treatment in apparatus similar to that shown in Figs. 1 and 2 or Fig. 5. In the furnace of Fig. 5, for example, the ore may be fed into the upper kiln and heated in its passage through. In the next kiln selective elimination of the sulfur may be largely completed. The reduced copper may be melted from the nickel sponge and separated and then the nickel melted, these last two operations taking place preferably in the finishing furnace.

My improvements are directly applicable to the treatment of lead ores, and in particular, lead-sulfid ores. Any of the apparatus shown is well adapted to this treatment and the particular one would depend on numerous features such as the impurities in the ore or other metals to be separated, such as copper on the one hand, and gold and silver on the other. The combination of apparatus shown in Fig. 5 is especially designed for lead ores in that it aims to supply all heat necessary by generating it in the producer and carrying it to the charge by means of the gas. The composition of this is controlled preferably by the height of the fuel bed. It may also be controlled by the use of burned gas in combination with air forced into the producer. I prefer, however, to make a highly reducing gas in the producer and burn a portion of it in the reducing chamber by admitting air through a twyer for this purpose, but limiting the amount of combustion so that the excess of reducing component will retain reduced the element desired—lead in this instance. In the apparatus shown in Fig. 5, the ore heated during passage through the first chamber is reduced in the lower rotary chamber and the sulfur separated as a gas. By maintaining the temperature above the melting point of lead, I may melt the reduced lead in this chamber, but I prefer to melt the spongy lead in another chamber shown at 58. This may be done by electric heat or it may be done by burning fuel in or through this chamber 58 and the products of combustion containing heat may be passed up through the chamber 53 where they would be mixed with reducing gas to accomplish selective oxidation of the impurities in the charge, or they may be otherwise disposed of in any suitable way.

Where lead-silver ores are treated, this process affords an easy means of separating the lead and silver from other metals. By properly regulating the temperature, lead may be melted out of a lead copper sponge.

One of the essential features of this process is the method of utilizing the gases, first to accomplish reduction under the influence of a controlled temperature, and subsequently to heat the material treated by burning the gas. The apparatus disclosed makes this possible.

The process is especially applicable to the treatment of materials where it is desirable to eliminate undesired components as gases. For example, the preliminary treatment of an iron ore may by this process eliminate the greater part of the phosphorus as a gas and also the sulfur by regulating the temperature and selectively oxidizing these elements. Also in the manufacture of hydraulic cement the processes of this invention offer an efficient means of eliminating the $CO_2$, and satisfactorily sintering the remaining materials. This may be carried out in a rotary cylinder fitted with means of maintaining long electric arcs through the kiln. The elimination of $CO_2$ may be facilitated also by blowing a reducing gas through.

In connection with blast furnace practice, the mode of heating gas in contact with arcs may be used to replace the expensive hot-blast stoves. By using the gas from the furnace to generate electricity through the medium of gas engines, which gas would otherwise be used to heat the hot-blast stoves, the electricity so generated may be efficiently converted into heat to heat the air used in the furnace and replace the stoves. In such event exhaust gas from the chamber 1 is drawn off through the pipe 80 and from thence through the pipe 80ª to be utilized in a well-known manner to operate the gas engine 81 (see Fig. 2). The gas engine 81 may then be utilized to drive the generator 82 which supplies current to the furnace through electrodes 4.

Although I have described in detail several of the applications of my invention, it is understood that it is in no wise limited to the methods herein described.

What I claim is:

1. The process of reducing ores which consists in (a) feeding ore and the required flux into a suitable furnace; (b) of generating the requisite heat in said furnace by means of high potential arcs, said arcs terminating on the charge; (c) forcing a gas having reducing properties for the metal desired reduced into contact with the ore in proximity to said arcs; and (d) separating the reduced molten metal.

2. The process of reducing ores which consists in (a) feeding ore and suitable fluxing material into a suitable furnace; (b) of generating the requisite heat in said furnace by means of high potential arcs; (c) blowing the flame of said arcs into contact with the ore by means of a gas having reducing properties toward the metal desired; and (d) collecting the molten metal.

3. The process of treating ores, under the influence of a regulated heat extraneous from that of reactions in the furnace chamber, with a gas capable at the temperature maintained of having a reducing action on one element of the charge while having an oxidizing action on another.

4. The process of extracting metals which consists of treating the ore while maintained at a predetermined temperature in a suitable furnace with a gas capable of reducing the metals desired, but not capable of reducing the elements of the charge not desired, maintaining the temperature in the furnace chamber by high potential arcs in proximity to the charge and finally separating the reduced metals by known means.

5. The process of treating sulfid ores and mattes which consists of (a) feeding ore or matte and a flux into a suitable furnace chamber; (b) controlling the heat in said chamber for the purpose of reducing and melting the ore therein; blowing into the charge in the heated zone a gas capable of reducing the metal desired and simultaneously oxidizing the sulfur and causing the elimination of undesired metals in combination with the flux.

6. The process of treating copper-iron-sulfid ores consisting in heating the ore and suitable flux in one chamber; transferring it into a smelting chamber; heating the charge in this lower chamber by means of electric heat; blowing into the charge in this heated zone a gas containing a reducing component and an oxidizing component, the reducing component being in excess of that required for equilibrium between copper oxid and copper; and separating the sulfur and slagging off the iron oxid with the flux and obtaining the copper in a refined state.

7. The process of treating ores in a suitable furnace chamber which consists in forcing into said chamber a heated reducing gas; and (b) blowing into said chamber an oxygen containing gas in such amount that the resultant gas will have reducing properties for the desired metal and oxidizing properties for other elements.

8. The process of heating a reducing gas by passage in contact with an electric arc, subsequently controlling its composition and then allowing it to react on ores and metals for purposes of refining.

9. The process of treating ores in a suitable furnace chamber which consists (a) in forcing into said chamber a reducing gas; (b) blowing into said chamber a limited amount of gas containing oxygen so that partial combustion of the reducing gas may take place to generate heat in said chamber; but limiting the amount of oxidation so that selective reduction of a given metal may take place.

10. The process which consists in reducing an ore by gaseous agents under the influence of electric heat in one chamber of a suitable furnace and subsequently burning these gases in a second chamber with an oxygen containing gas to heat the ore in said second chamber before entrance into the reducing chamber.

11. The process of heating and reducing ores which consists in (a) feeding the ore into a rotary kiln; (b) burning a reducing gas in said kiln; (c) discharging the material into the shaft of a melting and refining furnace; (d) forcing a reducing gas into the charge at the lower part of the shaft; (e) playing high potential electric arcs on the charge where the gas is blown in; (f) using the gas from the shaft chamber to heat the charge entering through the rotary kiln; and (g) separating the reduced molten metal.

12. The continuous process of producing metals direct from ore which consists in acting on the charge in one chamber by means of a gaseous agent having reducing properties for the element desired reduced and doing this under the influence of electric heat and subsequently burning the reducing gas in another chamber to heat the charge.

13. The process of separating different metals from an ore which consists in treating the ore under the influence of a regulated heat with a gas capable of reducing one metal, separating it in a molten state and subsequently reducing the other metal while hot, but at a different temperature.

14. The process of treating raw materials to eliminate undesired elements therefrom in the form of gas which consists of passing them through rotary kilns maintained at desired temperatures by electric arcs in the kilns and forcing through the kilns a gas capable of aiding said elimination.

In witness whereof, I, hereunto subscribe my name this 4th day of December A. D., 1909.

ALBERT E. GREENE.

Witnesses:
JNO. J. WHITE,
ISAIAH FRANK.